(12) United States Patent  
Hotell

(10) Patent No.: US 8,684,208 B2  
(45) Date of Patent: Apr. 1, 2014

(54) REUSABLE CONTAINERS FOR STORING FOODSTUFFS OR LIQUIDS

(76) Inventor: Chris Hotell, Carlsbad, CA (US)

( * ) Notice: Subject to any disclaimer, the term of this patent is extended or adjusted under 35 U.S.C. 154(b) by 526 days.

(21) Appl. No.: 12/560,649

(22) Filed: Sep. 16, 2009

(65) Prior Publication Data

US 2010/0288759 A1    Nov. 18, 2010

Related U.S. Application Data

(60) Provisional application No. 61/179,845, filed on May 20, 2009, provisional application No. 61/178,148, filed on May 14, 2009.

(51) Int. Cl.  
*B65D 8/10* (2006.01)

(52) U.S. Cl.  
USPC .............. 220/4.26; 215/10; 215/44; 220/304; 220/319

(58) Field of Classification Search  
USPC ............... 220/4.26, 4.27, 916, 304, 319, 324, 220/325; 206/516, 519, 520, 821  
See application file for complete search history.

(56) References Cited

U.S. PATENT DOCUMENTS

| | | | | | |
|---|---|---|---|---|---|
| 880,082 | A | * | 2/1908 | Kendrick | 215/6 |
| 1,064,442 | A | * | 6/1913 | Cadigan | 215/6 |
| 1,574,169 | A | * | 2/1926 | Reynolds | 220/304 |
| 1,595,186 | A | * | 8/1926 | Gray | 138/89 |
| 1,668,411 | A | * | 5/1928 | Kindervater | 220/304 |
| 1,712,551 | A | * | 5/1929 | Collier | 220/304 |
| 1,776,341 | A | * | 9/1930 | Turner | 220/304 |
| 2,234,084 | A | * | 3/1941 | Rauh | 220/304 |
| 2,267,754 | A | * | 12/1941 | Schroeder | 222/153.08 |
| 2,299,182 | A | * | 10/1942 | Schoof | 220/8 |
| 2,299,695 | A | * | 10/1942 | Greene | 220/304 |
| 2,305,197 | A | * | 12/1942 | Sheridan | 285/202 |
| 2,326,414 | A | * | 8/1943 | Thompson | 220/4.27 |
| 2,328,543 | A | * | 9/1943 | Bauman | 206/499 |
| 2,339,876 | A | * | 1/1944 | Phillips | 138/30 |
| 2,405,764 | A | * | 8/1946 | Smith | 206/543 |
| 2,415,031 | A | * | 1/1947 | Kuhn et al. | 220/304 |
| 2,562,496 | A | * | 7/1951 | Kirsch | 206/361 |
| 2,631,049 | A | * | 3/1953 | McGillis et al. | 285/354 |
| 2,746,485 | A | * | 5/1956 | Ashton | 138/31 |
| 2,746,486 | A | * | 5/1956 | Gratzmuller | 138/89 |
| 2,782,614 | A | * | 2/1957 | Currie | 220/718 |
| 2,828,043 | A | * | 3/1958 | Hosford, Jr. | 220/592.22 |
| 3,010,598 | A | * | 11/1961 | Foss | 220/4.26 |
| 3,156,272 | A | * | 11/1964 | Indrunas | 141/286 |
| 3,167,210 | A | * | 1/1965 | Carney, Jr. | 220/495.05 |
| 3,173,569 | A | * | 3/1965 | Craig | 220/304 |
| 3,193,129 | A | * | 7/1965 | Pfluger et al. | 220/4.16 |

(Continued)

FOREIGN PATENT DOCUMENTS

JP    2004303426 A * 10/2004 ............... F21L 4/00  
JP    2006061058 A *  3/2006

*Primary Examiner* — J. Gregory Pickett  
*Assistant Examiner* — Ned A Walker  
(74) *Attorney, Agent, or Firm* — Scott E. McPherson

(57) ABSTRACT

A container that is re-useable and may be disassembled for cleaning and reassembled and resealed for use as a beverage or foodstuffs container. The container assembly for storing foodstuffs or liquids includes an annular upper body with a first end adapted to receive a cap, and a second open end which connects with an annular lower body including a first open attachment end and a second closed bottom of container end and a seal which is compressed when securing the upper and lower bodies together.

8 Claims, 12 Drawing Sheets

(56) References Cited

U.S. PATENT DOCUMENTS

| | | | | |
|---|---|---|---|---|
| 3,225,956 A * | 12/1965 | Laming | 220/240 |
| 3,537,605 A * | 11/1970 | Solowey | 206/222 |
| 3,940,008 A * | 2/1976 | Flanders | 220/4.07 |
| 4,316,318 A * | 2/1982 | Mineo | 29/512 |
| 4,373,633 A * | 2/1983 | Lutz, Sr. | 206/508 |
| 4,444,324 A * | 4/1984 | Grenell | 215/6 |
| 4,598,832 A * | 7/1986 | Alonso | 215/6 |
| 4,603,784 A * | 8/1986 | Chang | 215/11.1 |
| 4,844,270 A * | 7/1989 | Coffman | 215/274 |
| 4,883,935 A * | 11/1989 | Fairchild et al. | 219/734 |
| 4,930,636 A * | 6/1990 | Meadows | 206/503 |
| 4,936,483 A * | 6/1990 | Ballu | 220/240 |
| 4,964,205 A * | 10/1990 | Coffman | 29/401.1 |
| 5,121,852 A * | 6/1992 | Wilkes | 220/203.12 |
| 5,152,965 A * | 10/1992 | Fisk et al. | 422/547 |
| 5,356,016 A * | 10/1994 | Wiedemann | 215/11.3 |
| 5,409,141 A * | 4/1995 | Kikuchi et al. | 222/81 |
| 5,422,129 A * | 6/1995 | Draddy | 426/115 |
| 5,503,187 A * | 4/1996 | Simmons et al. | 138/89 |
| 5,598,928 A * | 2/1997 | Hossard et al. | 206/509 |
| 5,782,345 A * | 7/1998 | Guasch et al. | 206/222 |
| 5,785,198 A * | 7/1998 | Credle, Jr. | 220/254.8 |
| 5,914,116 A * | 6/1999 | Suares et al. | 424/401 |
| 6,237,649 B1 * | 5/2001 | Moisio et al. | 141/100 |
| 6,527,109 B2 * | 3/2003 | Schoo et al. | 206/219 |
| 6,527,110 B2 * | 3/2003 | Moscovitz | 206/222 |
| 6,533,113 B2 * | 3/2003 | Moscovitz | 206/222 |
| 6,648,034 B1 * | 11/2003 | Birtcher et al. | 141/302 |
| 6,655,524 B2 * | 12/2003 | De Laforcade | 206/222 |
| 6,910,720 B2 * | 6/2005 | Shimei et al. | 285/331 |
| 6,966,348 B2 * | 11/2005 | Steidl et al. | 141/302 |
| 7,210,508 B2 * | 5/2007 | Behar | 141/329 |
| 7,308,915 B2 * | 12/2007 | Johns et al. | 141/100 |
| 7,607,460 B2 * | 10/2009 | Johns et al. | 141/329 |
| 7,780,029 B2 * | 8/2010 | Peterman et al. | 220/254.1 |
| 7,975,866 B2 * | 7/2011 | Peterman et al. | 220/254.1 |
| 2002/0020637 A1 * | 2/2002 | De Laforcade | 206/219 |
| 2003/0017236 A1 * | 1/2003 | Makita et al. | 426/115 |

\* cited by examiner

REUSABLE CONTAINERS FOR STORING FOODSTUFFS OR LIQUIDS

CROSS-REFERENCE TO RELATED DOCUMENTS

The present application is a non-provisional application which claims priority to provisional applications 61/179,845, filed May 20, 2009 and 61/178,148, filed May 14, 2009. Disclosures are incorporated herein in their entirety by reference.

BACKGROUND OF THE INVENTION

1. Field of the Invention

The present invention is in the field of containers for liquids and foodstuffs and pertains particularly to containers having two or more sections that are assembled together.

2. Discussion of the State of the Art

Bottled drinking water has become a much-used product in recent years because of consumer concerns about quality of tap water in many places. New concerns have arisen, however, concerning plastic materials used for water bottles, and the fact of leaching of chemicals from the plastic into the water, such as Bisphenol A (PBA). This chemical has been banned from baby bottles, for example, because it mimics chemically certain hormones. Some studies have estimated that this chemical is now present in the bodies of more than ninety percent of the US population.

Another difficulty with presently available containers for especially foodstuffs, beverages and water is that most such containers are difficult to clean inside, as the containers must be accessed through the typically single opening, some of which are quite small, and none of which are of the diameter of the container. Further, many containers, such as the plastic containers used for bottled water, are intentionally made to be discarded, and present a soon-to-be unsustainable load on the environment.

What is therefore needed in the art is a rugged container, designed and proven to be safe and non-contaminating for short and long term storage of human-consumable materials, such as water. The container should also be of a two-part architecture, to be opened along a seam through the major diameter of the container to make the interior easily accessible for cleaning, and the seam should present no contaminating effect to materials inside the container. Further, the parts of the closure that secures such a seam should themselves be capable of easy disassembly so that all parts can be thoroughly cleaned and perhaps disinfected, presenting no nooks and crannies that might resist thorough cleaning

SUMMARY OF THE INVENTION

A problem stated above is that contaminant free consumption of beverages including water and foodstuffs is desired, but existing plastic packaging such as containers and bottles used to contain many beverages including water and food stuffs leech contaminants like Bisphenol (BPA) into the contents of the package. Furthermore, much of the packaging is difficult to clean or reuse because of small single openings provided in the packaging like plastic bottles.

Therefore, the inventor searched the art of packaging looking for elements that exhibited insulative and non-contaminative properties that could be used to construct packaging for containing beverages like water and foodstuffs that would not contaminate the contents and would be easy to clean and safe to reuse. The packaging industry is driven by low cost replaceable products, one byproduct of which is an ever-increasing load of plastics ending up in the landfills.

The inventor realized during an inventive moment that at the time of packaging, containers could be provided using non-contaminative materials that could be repeatedly reused and that could be easily cleaned, significant waste reduction might result. The inventor therefore constructed a unique container that could be used in several forms that allowed beverages including water and foodstuffs to be packaged in a more contaminate free manner, but without requiring the package to be discarded after use. A significant waste reduction results with no impediment to consumption created.

Accordingly, in one embodiment of the invention, a container assembly for storing foodstuffs or liquids is provided comprising a annular upper body including a fist end adapted to receive a cap, and a second open end culminating in a flange, a annular lower body including a first open end culminating in a flange and a second closed end, the lower body disposed in vertical alignment beneath the upper body, an annular seal disposed between the flanges of the upper and lower bodies for sealing the upper and lower bodies together, a first threaded collar affixed to or slidable over the upper body, and a second threaded collar affixed to or slidable over the lower body, the first and second collars threaded together at opposite sides of the seal, compressing the seal between the flanges and securing the upper and lower bodies together.

In one embodiment the upper and lower bodies are manufactured of a stainless steel. In one embodiment the seal is silicone and the first and second threaded collars are plastic. In one embodiment the first collar as internal threading and the second collar has external threading the collars to be threaded together. In one embodiment the first end of the upper body is domed to a bottleneck opening threaded to receive a threaded cap.

In one embodiment the first end of the upper body is open and threaded to receive a threaded cover. In one embodiment the upper body is smaller in diameter than the lower body and fits into the lower body in an inverted position. In another embodiment the lower body is smaller in diameter than the upper body and fits into the upper body in an inverted position.

In one embodiment the second threaded collar includes a bottom step for abutting against the first threaded collar maintaining a small gap between the collars when fully threaded together the gap maintaining the integrity of the seal. In one embodiment the container is in the form of a canteen when assembled. In another embodiment the container is in the form of a bottle when assembled. In still another embodiment the container is in the form of a food container when assembled.

In one embodiment the container of the version having the smaller diameter upper body further includes an annular seat, the annular seat threaded and affixed to the closed end of the lower body and substantially in line with the opening of the upper body wherein when the upper body is nested into the lower body the cap is used to secure the upper body to the lower body by threading the cap to the annular seat. In one embodiment the lower body and upper body are held together in nested configuration by the threaded collars.

According to one aspect of the present invention, a method for securing two container bodies together at a seal point the container bodies flanged at their interfacing ends. The method includes steps (a) aligning the two container bodies flange to flange, (b) placing a seal between the flanges, and (c) using threaded collars affixed to the flanges or slid over the bodies and seating against the flanges, threading the collars together to securing the container bodies together against the seal.

In one aspect of the method each flange has a rearward-protruding fin that engages a slot extending around the threaded collar retaining the collars at the location of the flanges. In one embodiment of the method in step (b) the seal is silicone. In this embodiment the secured container bodies form one of a canteen, a bottle, or a food container. In one embodiment the threaded collars leave a gap when fully threaded together to protect the integrity of the seal.

BRIEF DESCRIPTION OF THE DRAWING FIGURES

DETAILED DESCRIPTION

The inventors provide a container in various embodiments that is re-useable and may be disassembled for cleaning and reassembled and resealed for use as a beverage or foodstuffs container. The invention is described in enabling detail in the following examples, which may represent more than one embodiment of the invention.

Figure 1:
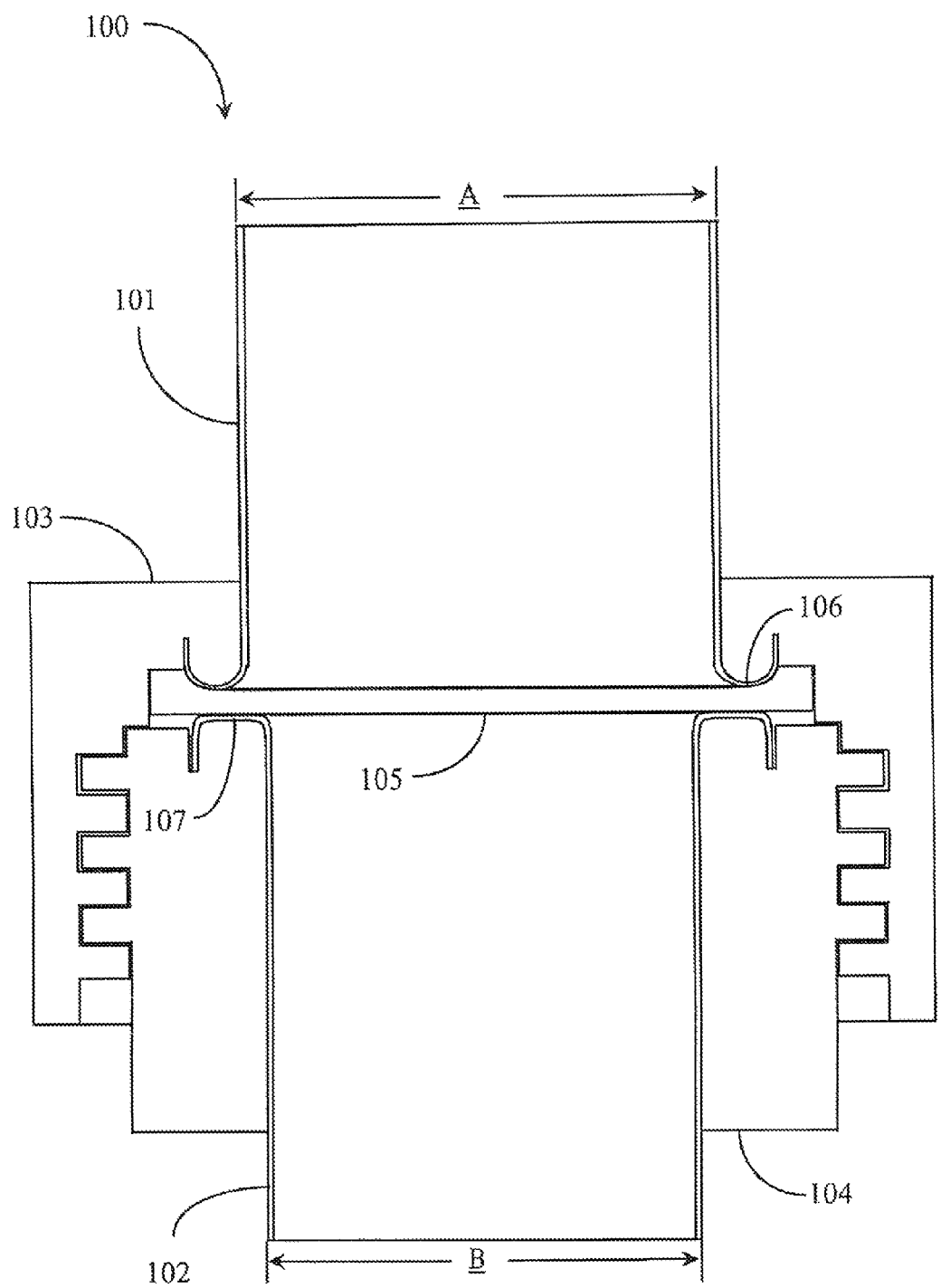
FIG. 1 is a front view of a container according to an embodiment of the present invention.

FIG. 1 is a front view of a container 100 according to an embodiment of the present invention. Container 100 is illustrated in this example comprising two separate container sections illustrated herein as a section 101 and a section 102. Container section 101 is substantially annular and may be completely open at one or both ends of the section. Container section 101 may be manufactured from a stainless steel or other durable material that may be used safely with beverages and foodstuffs.

Container section 101 has a flange 106 formed therein or otherwise affixed thereto at one end. Flange 106 may be formed of the same material as the container and may be a contiguous feature of the container section. Flange 106 protrudes out and away from the center of container section 101 and may in some embodiments extend rearward somewhat similar to a "J" configuration. Container section 101 may be open at the end opposite flange 106, such end being adapted to accept a cover (not shown). In one embodiment the free end of container section 101 is partially closed to a smaller opening that may employ a threaded cap to secure the contents within the container.

Container section 102 is annular and includes a closed end representing the bottom of the container in this example. Container section 102 has a flanged end for effecting interface with container section 101. A flange 107 is formed on or otherwise affixed to the open end of container section 102. Flange 107 may be formed of the same material as the container and may be a contiguous feature of the container section. Like flange 106 described above, flange 107 protrudes out and away from the center of container section 102 and may in some embodiments extend rearward somewhat similar to a "J" configuration.

Container section 101 is assembled to container section 102 to form container 100 using a threaded assembly comprising an upper collar 103 and a lower collar 104. Upper collar 103 may be in the form of a ring that may be slid over the outer diameter A of container section 101. Upper collar 103 may be provided of a plastic of some mixture of polymer. Other durable materials may be used to make upper collar 103 without departing from the spirit and scope of the present invention. Upper collar 103 has a first inside surface extending from one end for some length that is threaded for the purpose of coupling. Collar 103 has a minor inside diameter that is just larger than outside diameter A of container section 101 so that the upper collar may be slid over container section 101.

Lower collar 104 is in the form of an annular ring having an inside diameter just larger than the outside diameter of container section 102 illustrated herein as diameter B. Lower collar 104 may be made of a polymer or other durable material. Lower collar 104 is externally threaded about the peripheral surface of the collar from a first end to some length thereof. Lower collar 104 may be screwed into upper collar 103 by virtue of mating threads.

Container 100 has a seal 105 that is disposed between container section 101 and container section 102. Seal 105 may be a flexible and resilient silicone seal or some other sealing material that is considered safe to expose to any intended contents of the container. In one embodiment seal 105 is a rigid metallic adapted with high finish metal sealing surfaces. In one embodiment seal 105 is made from a rigid plastic. Seal 105 is annular having an outside diameter and an inside diameter of such dimensions that a sufficient portion of the material is disposed between flange 106 of container section 101 and flange 107 of container section 107.

Upper collar 103 has a stop shoulder provided therein and extending around the inside bottom of the thread configuration. Likewise, lower collar 102 has a shoulder provided thereon and extending about the outside wall of the collar just before the first external thread of the lead end of the collar. The shoulders described in both collars abut when the collar are threaded fully together such that a small gap is left between container sections when assembled, the gap occupied by seal 105 in a compressed state. The gap prevents over tightening against the seal and perhaps damaging the seal.

Container section 101 and container section 102 are assembled together to form container 100 by placing seal 105 in between the container sections at the flanges and by installing the upper and lower collars over their respective container sections and threading the collars together gathering the sections together over the seal to form a impenetrable seal between the container sections. In this example, flanges 106 and 107 have one or more fins that extend rearward and that are adapted to seat into one or more slots provided in collar 103 and in collar 104. In one embodiment flanges 106 and 107 are straight flanges meaning that there are no fins or other appendages extending from the basic flange.

In one embodiment collar 103 and collar 104 are affixed to respective flanges 106 and 107. In this case screwing the two container sections together with the seal placed between them is all that is required to assemble container 100. In another embodiment the collars are lose and either abut against the flanges when installed over respective container sections or fit onto the flanges by virtue of the reward fin or fins.

It is noted herein that the outside diameter B of container section 102 may be less than the inside diameter of container section 101. In this case, container section 102 may be fitted or nested into container section 101 the lower section inverted in position. In a nested configuration the collars may still be used to secure the sections together.

Figure 2:
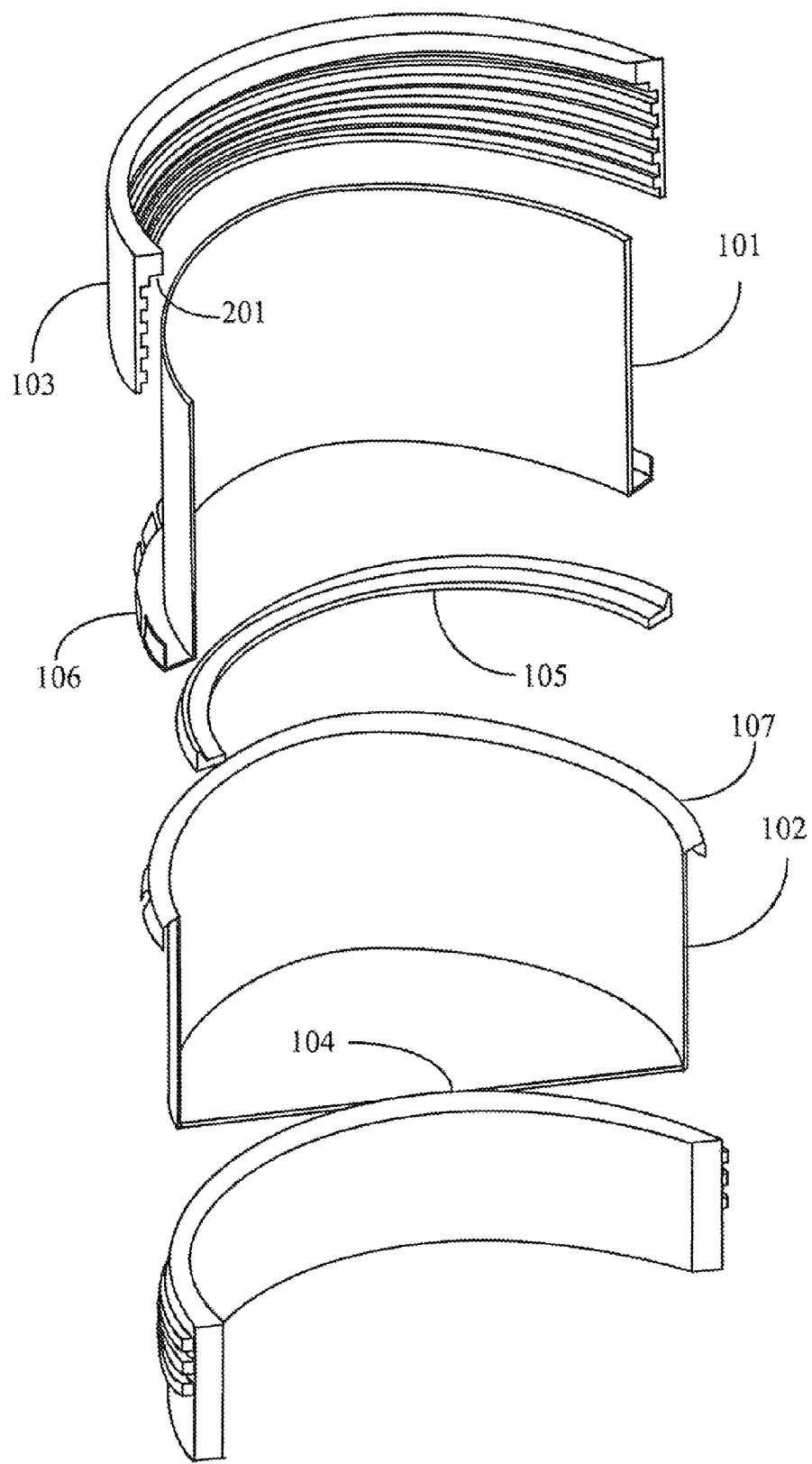
FIG. 2 is a perspective sectional view of the components of container of FIG. 1 disassembled according to an embodiment of the present invention.

FIG. 2 is a perspective sectional view of the components of container 100 of FIG. 1 disassembled, according to an embodiment of the present invention. Collars 103 and 104 are visible in perspective and sectional views in this example. Flange 106 has a number of reward extending fins designed to fit into one or more slots provided in collar 103. Also in this example, seal 105 has an upward protruding edge to help guide it into sealing position when the two container sections 101 and 102 are gathered together for assembly. Container section 102 has a closed end that serves as the bottom of the assembled container. The top end of container section 101 may be partially closed or may be formed according to variant bottle, container, or canteen profiles. In one embodiment additional open-ended sections may be provided including additional collars for assembling those sections such that the container may be made longer so that more foodstuffs or beverage can be contained therein.

Figure 3:
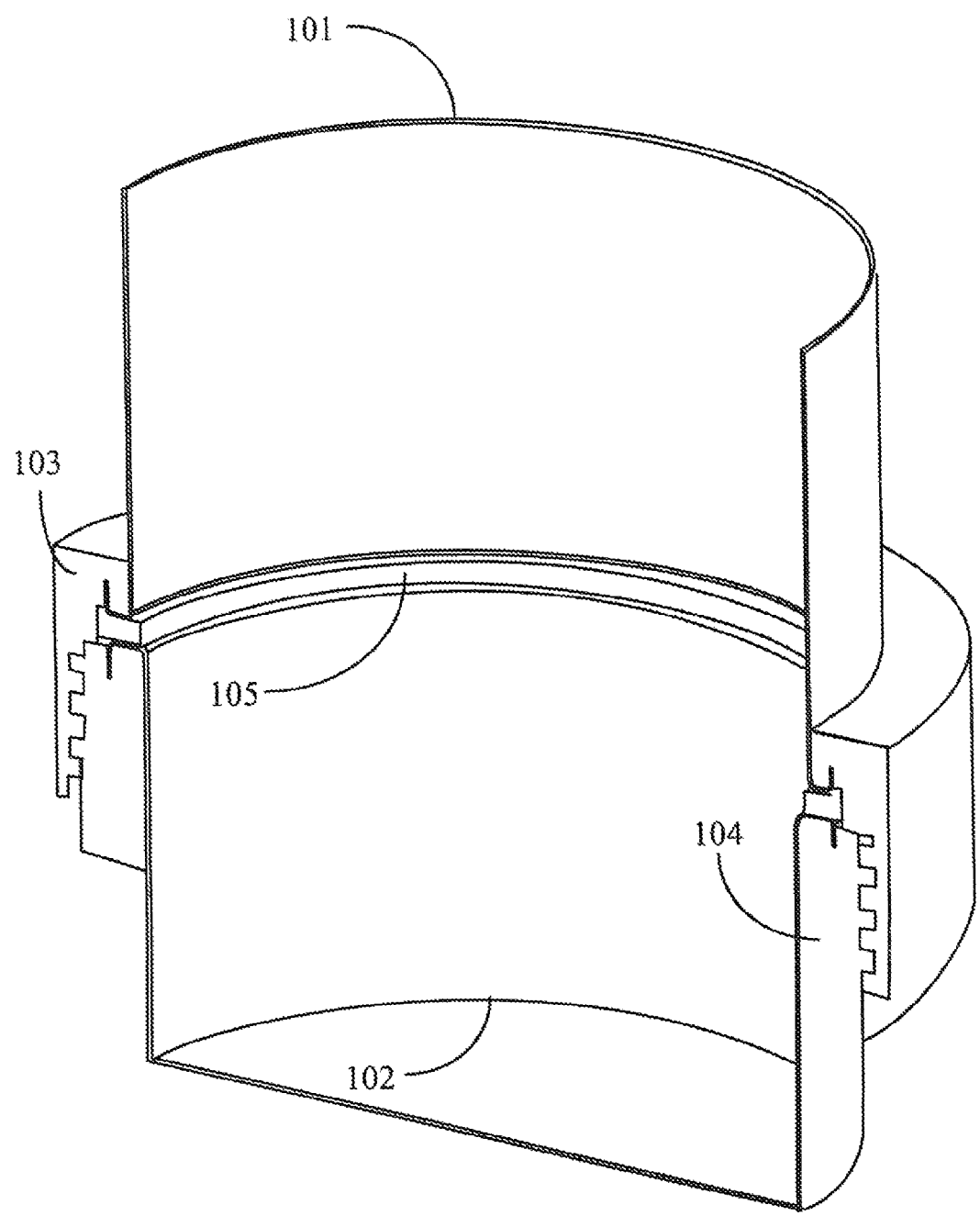
FIG. 3 is a perspective sectional view of the components of container of FIG. 1 assembled according to an embodiment of the present invention.

FIG. 3 is a perspective sectional view of the components of container 100 of FIG. 1 assembled, according to an embodiment of the present invention. In this example, collars 103 and 104 are fully threaded over seal 105 and the flanges effectively sealing the seam in a way that is environmentally safe relative to exposure of the contents to any contaminants including plastics that might emanate contaminants while heated or otherwise. Collars 103 and 104 may be larger or smaller relative to container sections 101 and 102 as shown in this view without departing from the spirit and scope of the present invention. Container section 102 is illustrated with a floor or bottom in this example but container section 102 may also be open ended without departing from the spirit and scope of the present invention, for example, if more sections will be used to create a container.

Figure 4:
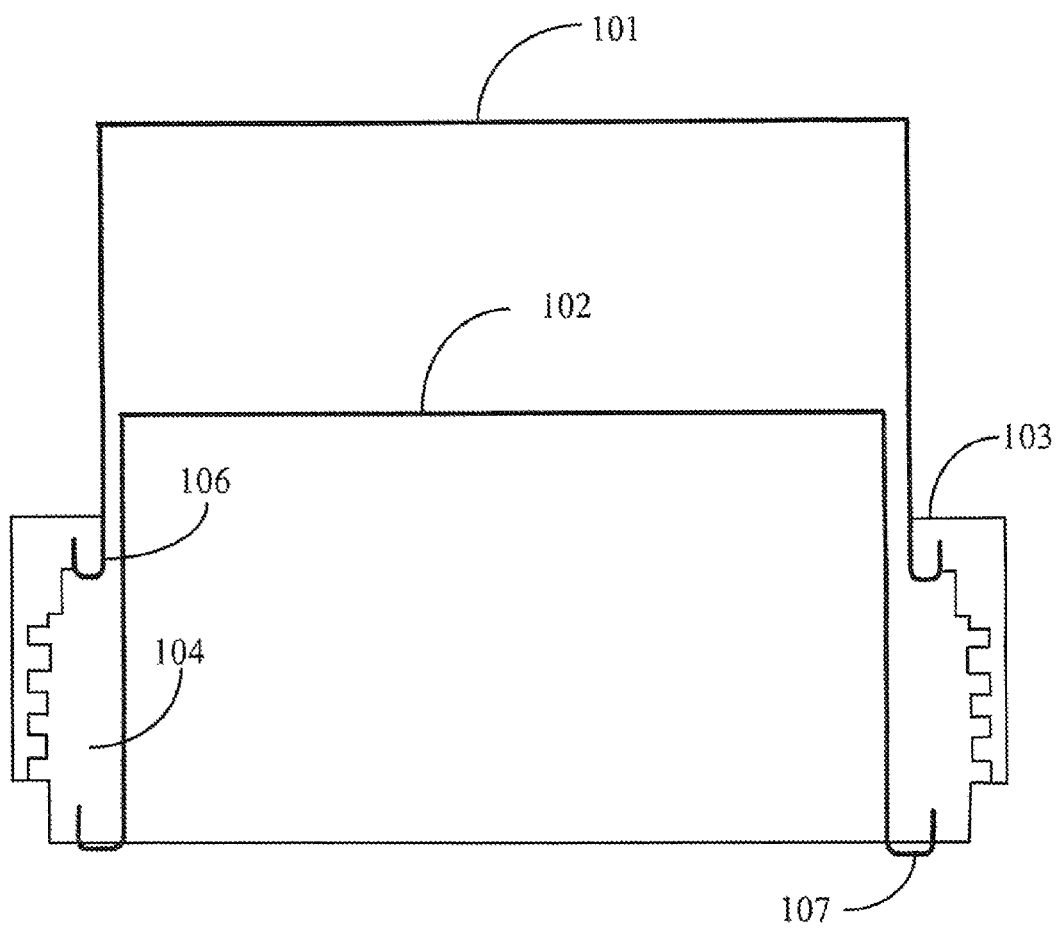
FIG. 4 is a front sectional view of a container in nested configuration according to an embodiment of the present invention.

FIG. 4 is a front sectional view of the container of FIG. 1 arranged in a nested configuration according to an embodiment of the present invention. Container section 102 is inverted from the normal position for assembling a container and inserted into the bottom opening of container section 101. In this nested configuration the collars 103 and 104 may be threaded together to hold the two container sections together. The seal (105) may or may not be present in this example as sealing is not required in a nested configuration.

It will be seen in the examples of FIG. 1 through FIG. 4 that one section is smaller in diameter than the other, and that each section is formed with an interface configured to join with a threaded plastic collar, one of which is female-threaded and the other male-threaded. The metal sections may be stamped or spun, or made by some other suitable process, and each has a mating interface such that an associated plastic collar may be assembled from one end to mate at the interface with the metal body. When each of the upper and the lower sections has been assembled to the appropriate plastic collar, then a silicone seal may be placed and the sectioned joined by threading one of the collars into the other. The interface is such that only one thin edge of the silicone seal will be exposed in any way to materials in the container. The plastic collars are not so exposed.

Figure 5:
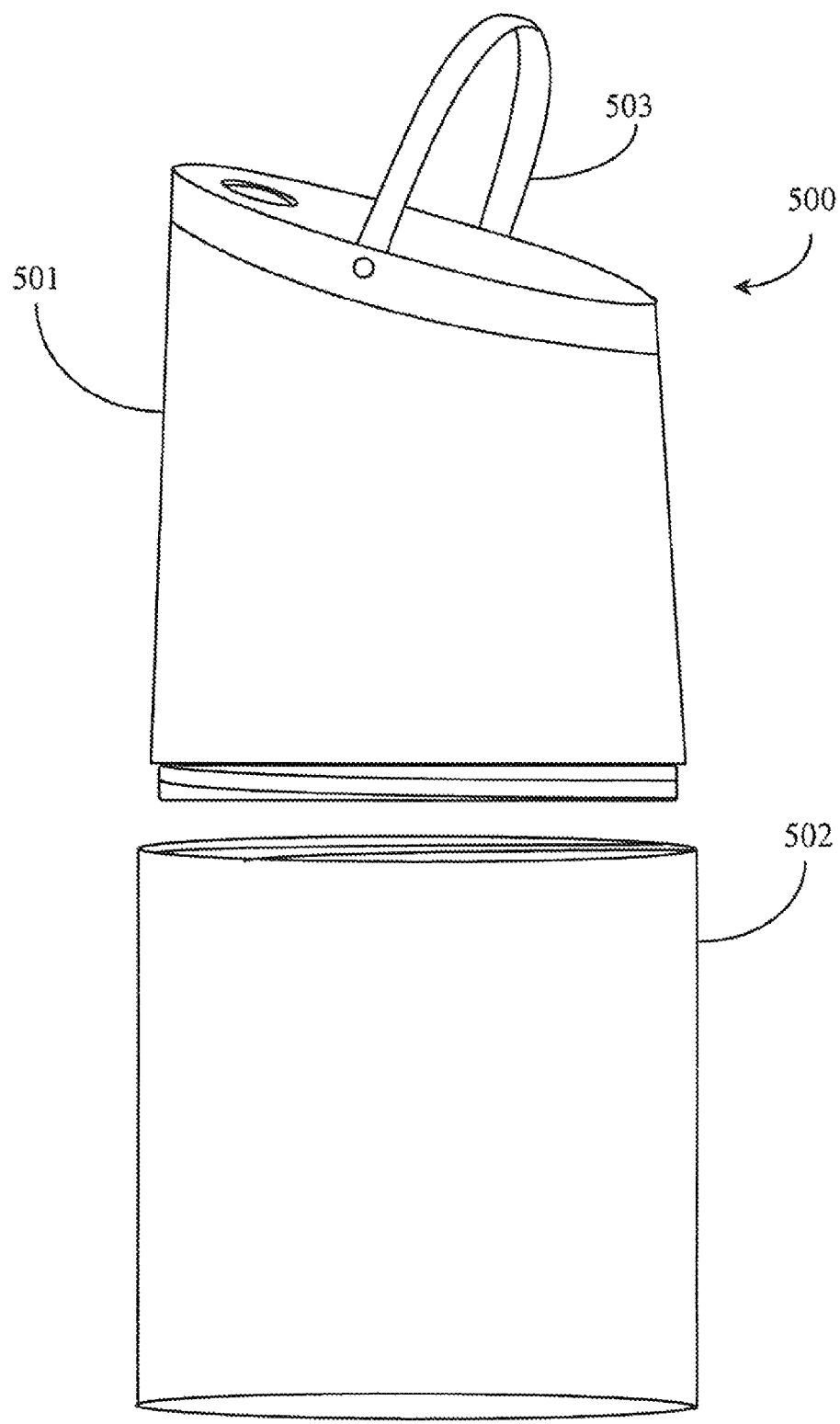
FIG. 5 is an elevation view of a container according to another embodiment of the present invention.

FIG. 5 is an elevation view of a container according to another embodiment of the present invention. A container 500 is illustrated in this example comprising an upper container section 501 and a lower container section 502. In this example container section 501 is annular in shape having an open lower end with a step down section that is externally threaded for coupling to lower container section 502. Container section 501 is metal in a preferred embodiment such as made from a stainless steel. Container section 501 is widest in diameter nearest the bottom end before the threaded step-down feature and steadily narrows toward the opposite end of the container section.

Container section 501 has a canteen style cover having a small opening and a carrying handle 503. The cover and carrying handle may be made of any durable material but metal such as stainless steel is preferred. In this configuration container section 501 is assembled to lower container section by screwing the sections together. Container section 502 has an annular profile has a closed bottom end representing the bottom of the container when assembled. Section 502 is threaded internally at the open end for accepting the external threading on container section 501. Container section 502 is substantially of a same width or diameter. The inside diameter of container section 502 is just larger that the largest outside diameter of container section 501. In this example, the upper container section 501 may be inserted upside down into the lower container section to achieve a nested configuration similar to that described further above.

In one embodiment a seal such as an o-ring, for example may be provided to seat over the threaded end of section 501 so that a seal is achieved when the two sections are threaded together. In this example collars are not used or required. The seam occurs at the largest diameter of the container, so when the container is opened at the seam, the openings into the two sections 501 and 502 are at least as large as any portion inside either section, making the interior surfaces easily accessible for cleaning In this version the upper section is made to be slightly smaller in diameter then the lower section so, when disassembled, the upper section may be inverted and stored within the lower section. In one embodiment one or more central container sections (not shown) may be provided to lengthen the container when assembled. Such a section would be threaded at an upper end to container section 501 and at the lower end to container section 502, the central section having the appropriate threaded features.

Figure 6:
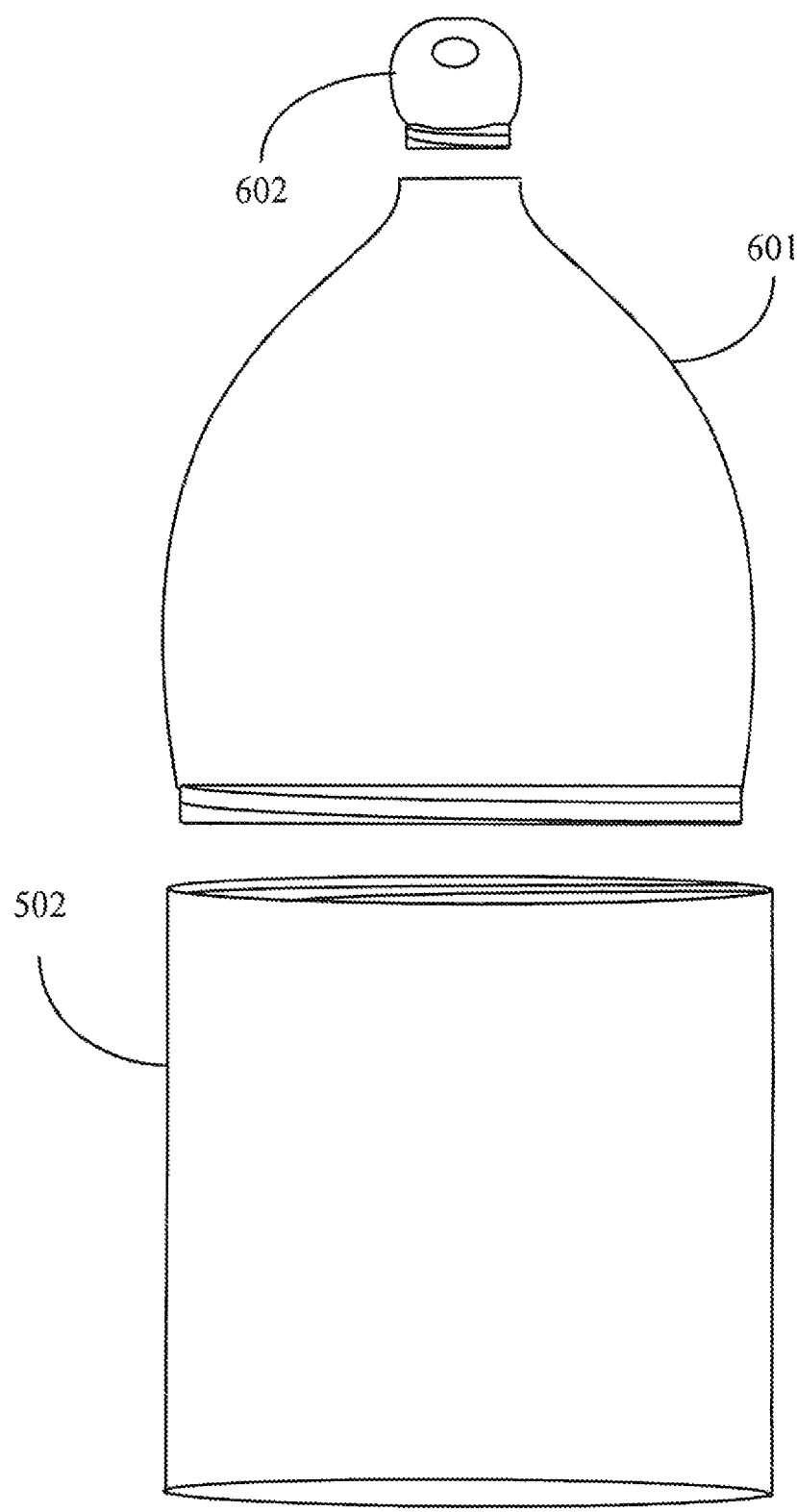
FIG. 6 is an elevation view of a container according to another embodiment of the present invention.

FIG. 6 is an elevation view of a container according to another embodiment of the present invention. In this example a container is provided using bottom section 502 from the example described above. A top container section 601 is illustrated that is domed at one end and open at the opposite end. At the open end a step down feature with external threading is provided to enable a user to screw top section 601 on to container section 502 as described further above. It is noted herein that the preferred material for container section 601 is stainless steel, but other clean metals may be substituted for stainless steel. In one embodiment the threaded surfaces are contiguous and of the same material as the container. In another embodiment the threaded features are inserts in the case of internal threading and threaded collars in the case of external threading. The threaded features may be nylon, Delran, or some other polymer-based material. There may or may not be a seal in this embodiment.

Top container section 601 is domed to a bottleneck opening and a cap 602 is provided to close the opening. Cap 602 has a stem portion that is externally threaded and is adapted to screw into the opening, which may be presumed to have internal threads provided about the inside diameter of the bottleneck opening. In this embodiment the widest outside diameter of container section 601 is smaller than the inside diameter of container section 502 to enable the top section to be nested within the bottom section in an inverted position as will be detailed later in this specification.

Figure 7:
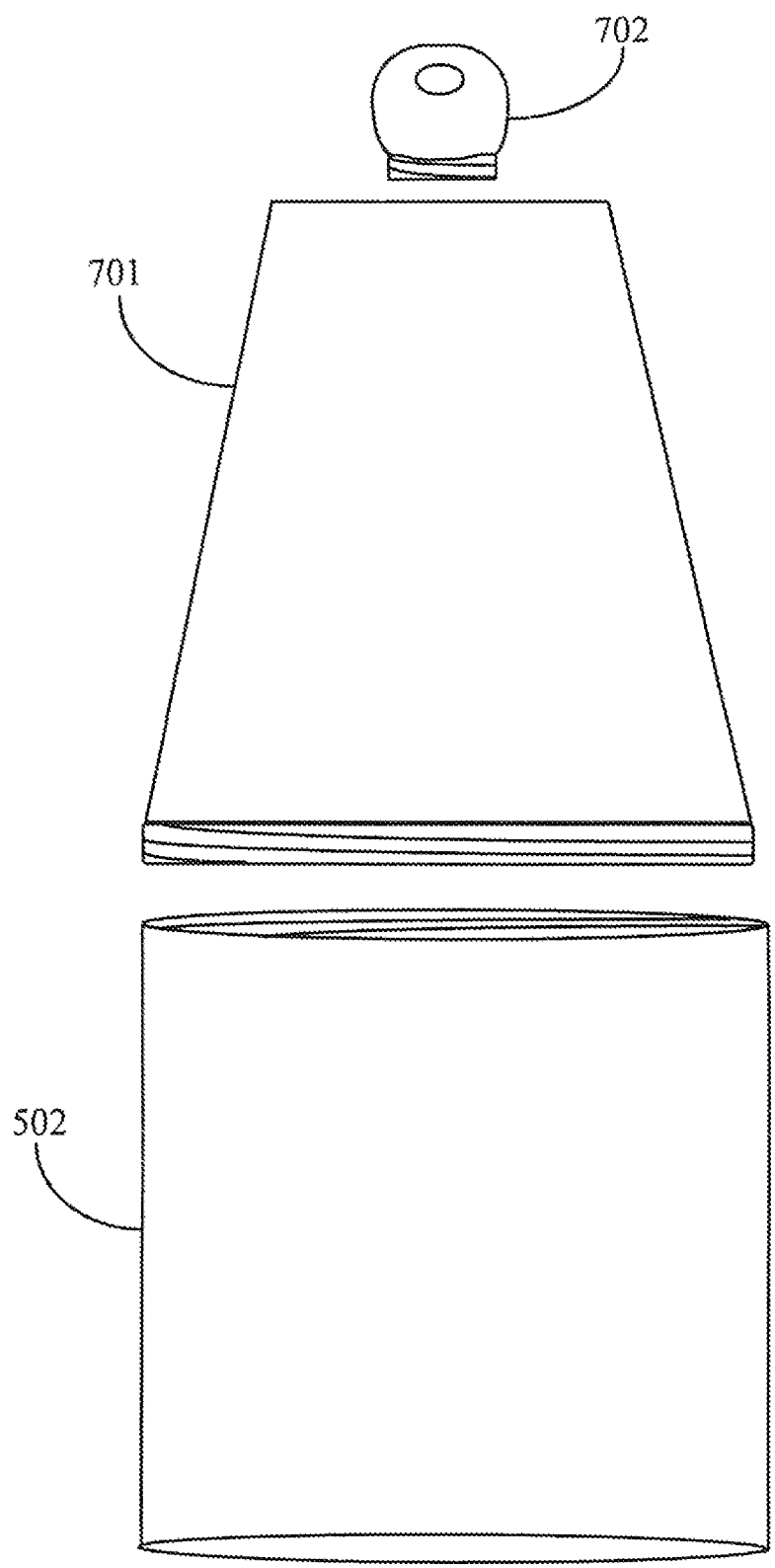
FIG. 7 is an elevation view of a container having a different style top section according to another embodiment of the present invention.

FIG. 7 is an elevation view of a container having a different style top section according to another embodiment of the present invention. Container section 502 is unchanged from previous examples. A top container section 701 is illustrated in this embodiment. Container section 702 is conical in profile having a widest outside diameter just before the feature exhibiting external threading for coupling the section to lower container section 502. Container section 701 tapers conically toward a substantially flat end that is closed to an opening that may be closed by a cap 702. The opening (not shown) may include internal threading that is adapted to accept external threading provided on the stem of cap 702.

In another embodiment cap 702 may be a plug instead of a threaded cap. However in a preferred embodiment the cap is threaded. As described in other previous embodiments, top container section 701 may be inverted in position and nested down into container section 502. In this case the external threading at the open end of section 701 may be used in the inverse position to secure the nested configuration by threading to the internal threads of container section 502.

In a preferred embodiment section 701 is fabricated from stainless steel or some other clean metal suitable for manufacture of canteens. The seam of the container is located at the widest outside diameter of both container sections allowing for the best access conditions for cleaning the container sections. In all of the embodiments described herein, cleaning may be conducted with detergents and water, with or without abrasion by such as brushes, by commercial dishwasher, by sterilization in an autoclave of some sort, or by any combination of cleaning process known. As with other embodiments thus far described, there may or may not be a seal provided to enhance the sealing capability of the threaded features. Further the threaded features may be provided in a material that is different than the material used to make the container sections.

Figure 8:
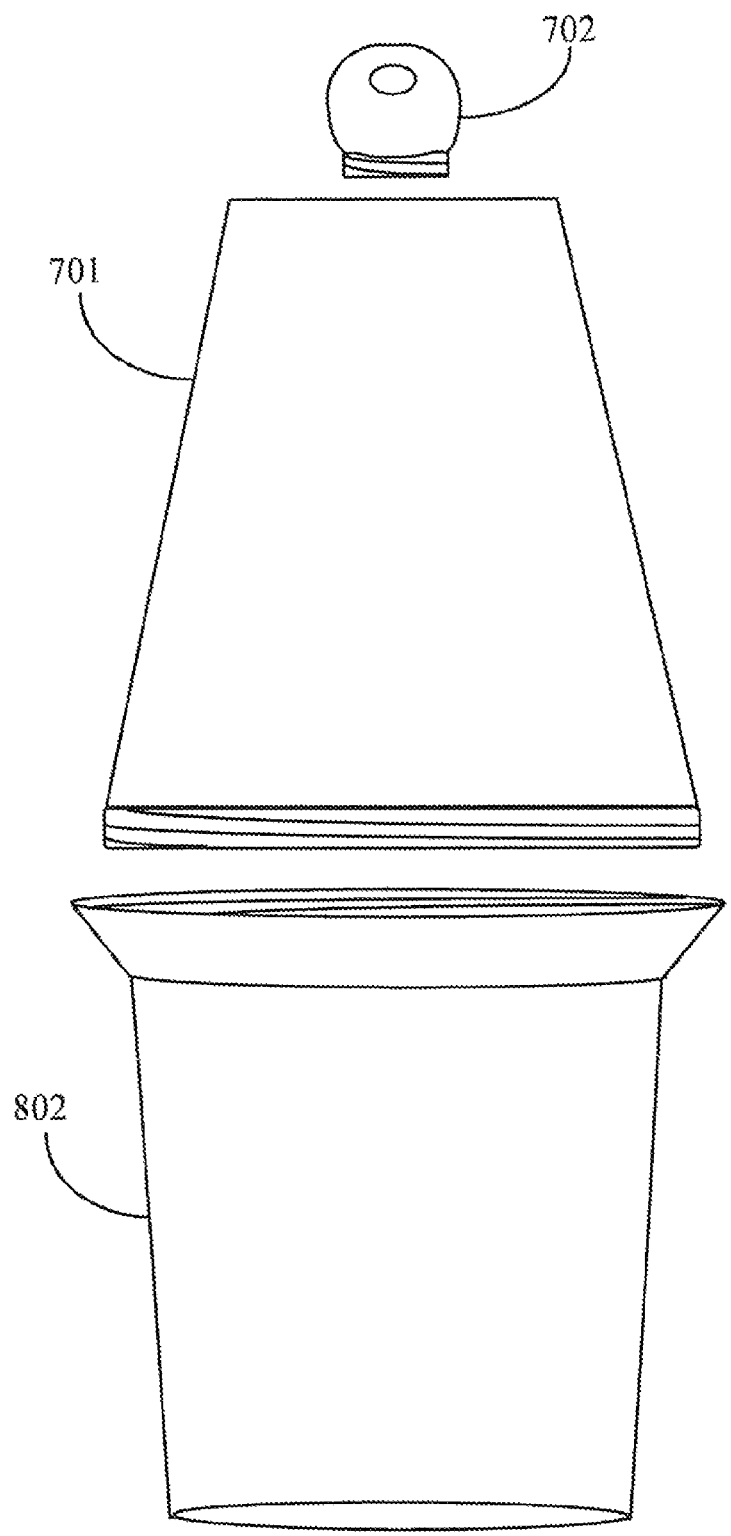
FIG. 8 is an elevation view of a container having a different style bottom section according to an embodiment of the present invention.

FIG. 8 is an elevation view of a container having a different style bottom section according to an embodiment of the present invention. In this embodiment top container section 701 and cap 702 remain unchanged from the previous example. A lower container section 802 is provided and assembled to top section 701. Container section 802 has a bottom closed end representing the bottom or floor of the container when assembled. The opposite end of container section 802 is flared outward at an angle. From the location of the flared portion to the closed end, the container section is conical with the widest outside diameter of the conical portion located at the line of flare.

The flared portion of container 701 has internal threading adapted to accept the external threading of container section 701. In this configuration the bottom container section 802 may be inverted and nested into the top container section. In another variation container portion 802 has a widest outside diameter below the flare feature that is smaller than the widest outside diameter of top container section 701 just behind the threaded feature allowing the top container section to be nested inside the bottom container section when inverted. In some embodiments the cap analogous to cap 702 can be used to secure the nested position if a threaded seat is provided on the bottom inside surface of closed end of the bottom container section. Such an embodiment is described below.

Figure 9:
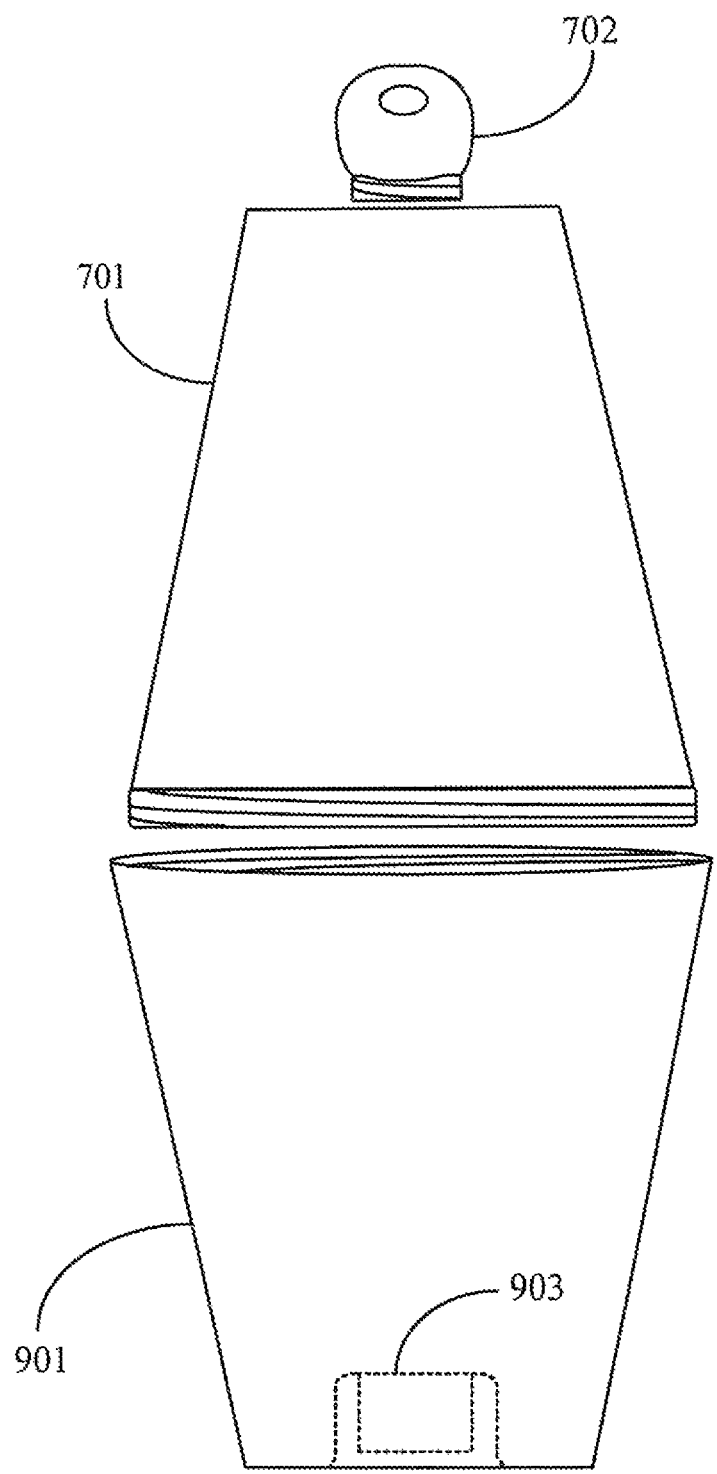
FIG. 9 is an elevation view of a container having an annular seat for securing the container in a nested position.

FIG. 9 is an elevation view of a container having an annular seat for securing the container in a nested position. Container section 701 and cap (702) remain unchanged from the previous examples. A container section 901 is provided in this embodiment and is conically shaped. Container 901 has an open end at the widest outside diameter, the open end having internal threading on the inside surface or the opening. The internal threading just described is adapted to accept the external threading on top container section 701. Container section 901 has a closed end representing the bottom or floor of the container when assembled.

An annular seat 903 is provided on the inside surface of the wall forming the closed end of container section 901. Annular seat 903 may be affixed to the wall by welding, soldering, or some other attachment method like gluing, brazing, or some other process. Seat 903 has a free end that is open and that has internal threading provided about the inside surface of the seat extending to a depth suitable for accepting the entire length of threading on the cap. Container section 901 is dimensionally larger than top container section 701. A user may therefore, invert top container section 701 and may nest the container in the inverted position inside bottom container 901.

In this example, the partially closed end of top container 701 would abut against the top surface of seat 903 when nested and cap 702 might be used to secure the sections together in a nested position. Seat 903 may be made of stainless steel or some other durable metal or some other material resilient enough to support threading and securing of the top container section to the bottom container section in nested configuration. In the nested configuration the container is more easily stored and transported. The seam is located at the widest outside diameters of both container sections to facilitate easier access for cleaning the container sections.

Figure 10:
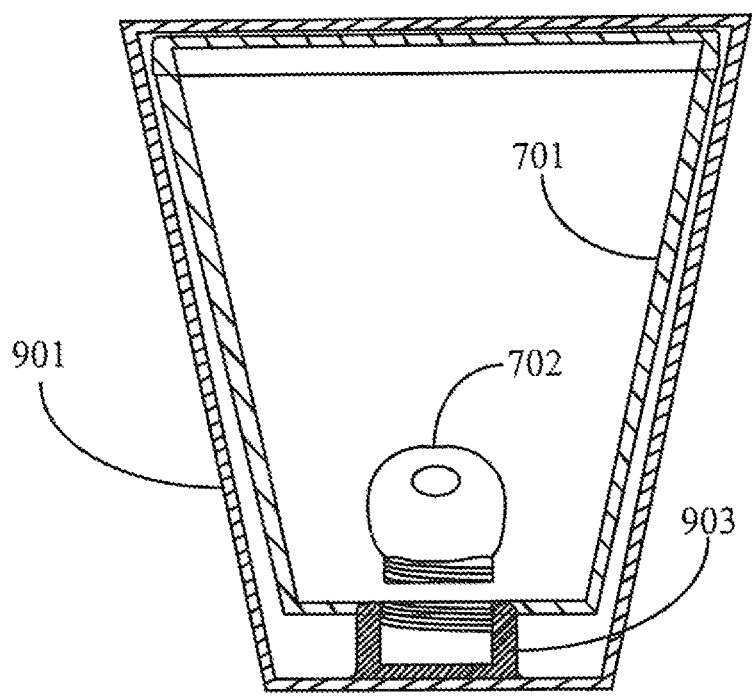
FIG. 10 is a sectional view of the container of FIG. 9 in a nested position according to an embodiment of the present invention.

FIG. 10 is a sectional view of the container of FIG. 9 in a nested position according to an embodiment of the present invention. In this example top container section 701 is nested within bottom container section 901. Cap 702 is used to secure the two container sections in the nested position. The external threading on the cap is fits into the internal threading of seat 903 through the threading of the opening of the top container section. In a preferred embodiment of the present invention nesting configurations are desired and may vary slightly according to the dimensioning of the container sections involved in the nesting process. Some nested configurations are secured by threading the container sections together with one of the containers in an inverse position.

Figure 11:
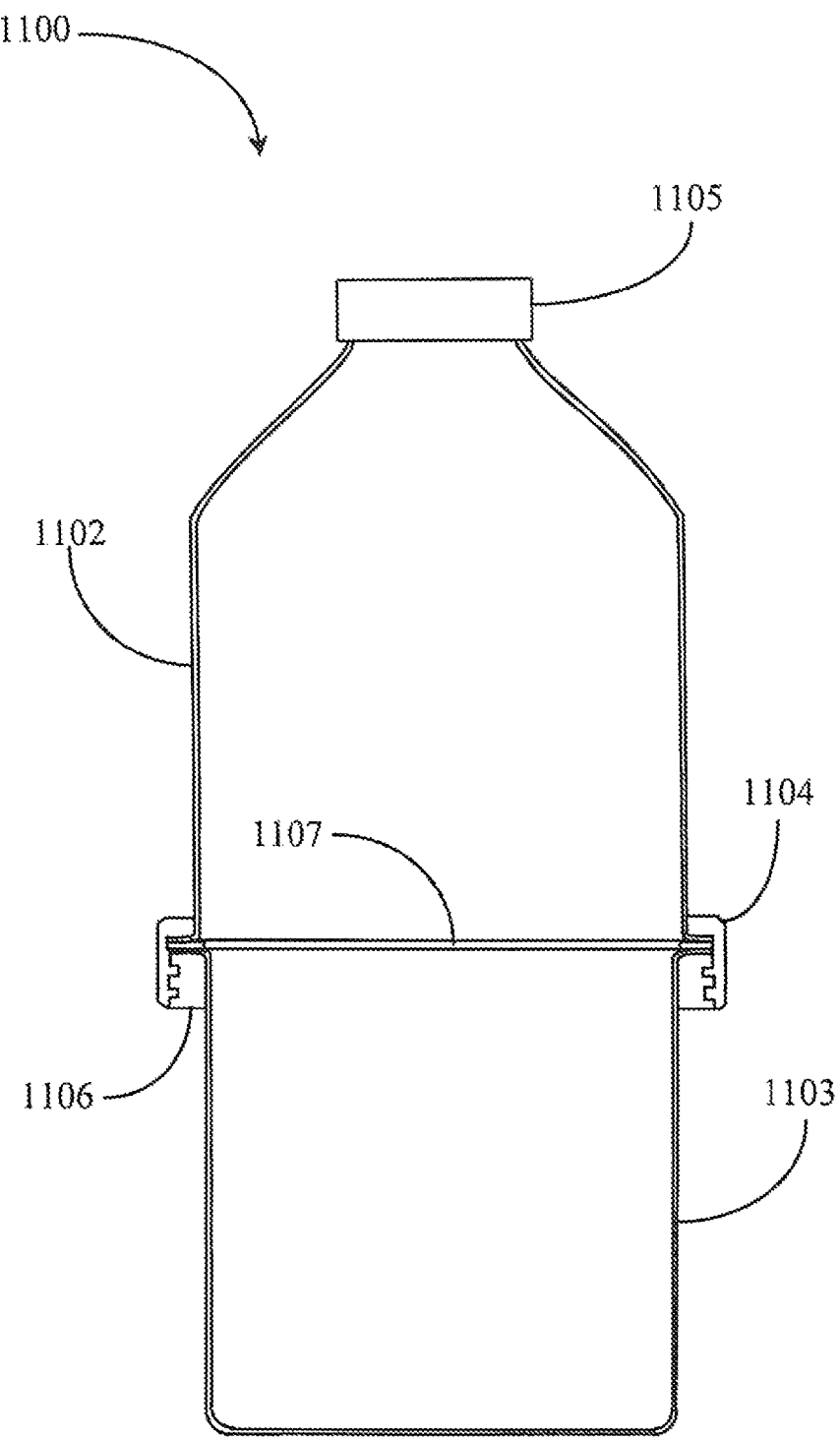
FIG. 11 is an elevation view of a bottle according to an embodiment of the present invention.

FIG. 11 is an elevation view of a bottle according to an embodiment of the present invention. A bottle 1100 is illustrated and comprises two bottle sections. A top bottle section 1102 is annular in configuration having a lower open end that interfaces with a lower bottle section 1103. Top bottle section 1102 narrows or tapers down in dimension to a bottleneck opening that may be externally threaded to accept a bottle cap 1105 having internal threads. In one embodiment cap 1105 may be externally threaded to fit into internal threading provided on the inside surface of the bottleneck opening.

Lower bottle section 1103 is annular in configuration and has a closed end representing the bottom or floor of the bottle when assembled. Lower bottle section 1103 has an open end that interfaces with top bottle section 1102. Bottle sections 1102 and 1103 may be manufactured from a stainless steel or other clean and durable metals in a preferred embodiment. In this embodiment both bottle sections 1002 and 1103 are flanged at the open, interfacing ends. In this case the flanges are straight flanges with no fins or tabs that extend rearward as was described in other flanged embodiments of the present invention.

As in other embodiments already described, the seam where the bottle sections are secured together is located at the widest outside dimension for both bottle sections facilitating easier access for cleaning the sections when disassembled. In this embodiment plastic collars are used to secure the bottle sections together over a seal 1107. An upper plastic collar 1104 may be installed over the upper bottle section 1102 and a lower plastic collar may be installed over the lower bottle section 1103. The collars are designed with threaded interfaces, internal threading for upper plastic collar 1102 and external threading for lower plastic collar 1106.

In this embodiment the collars are not seated or affixed to the flanges but instead abut against the flanges when threaded together. Top collar 1104 has a minor inside diameter just larger than the major outside diameter of bottle section 1102 so it may be installed over the section to seat against the flange at the open end of the section. Likewise collar 1106 has an inside dimension that is just larger than the major outside diameter of lower bottle section 1103 so that it may be installed over the section and seat against the flange at the open end of the section. Collar 1106 is externally threaded and may be installed over the lower bottle section with either side facing the flange.

Seal 1107 is located between the flanges and is compressed between them when the collars are threaded together and tightened. Seal 1107 is compressed so that only a very thin line of seal is exposed to the contents of bottle 1100. To assemble bottle 1100, a user takes the top section in hand and places collar 1107 over the section so that the threads are facing down and it seats against the flange. The user then takes the bottom section in hand and places collar 1106 over the bottom holding it up against the flange. Seal 1107 is placed between the flanges and the threads of both collars are engaged. The user then threads the collars together tightly to effect the seal between the bottle sections. Seal 1107 may be a flat seal having an inside diameter and an outside diameter such that the majority of the sealing surface of the seal lies between the flanges. Seal 1107 may, in one embodiment, be architect to facilitate easier location of the seal onto the flanges by provision of a peripheral rise feature or a location groove, or some other location feature.

Collars 1104 and 1106 may be larger or smaller relative to the size of bottle 100 without departing from the spirit and scope of the present invention. Bottle 1100 may be extended in length by providing one or more center bottle sections open and flanged at both ends and collars including a seal for securing the one or more center sections to the top and bottom sections.

In one embodiment lower bottle section 1102 has an outside diameter that is just smaller than the inside diameter of upper bottle section 1102. In this case the lower section of the bottle may be nested within the upper section of the bottle.

Figure 12:
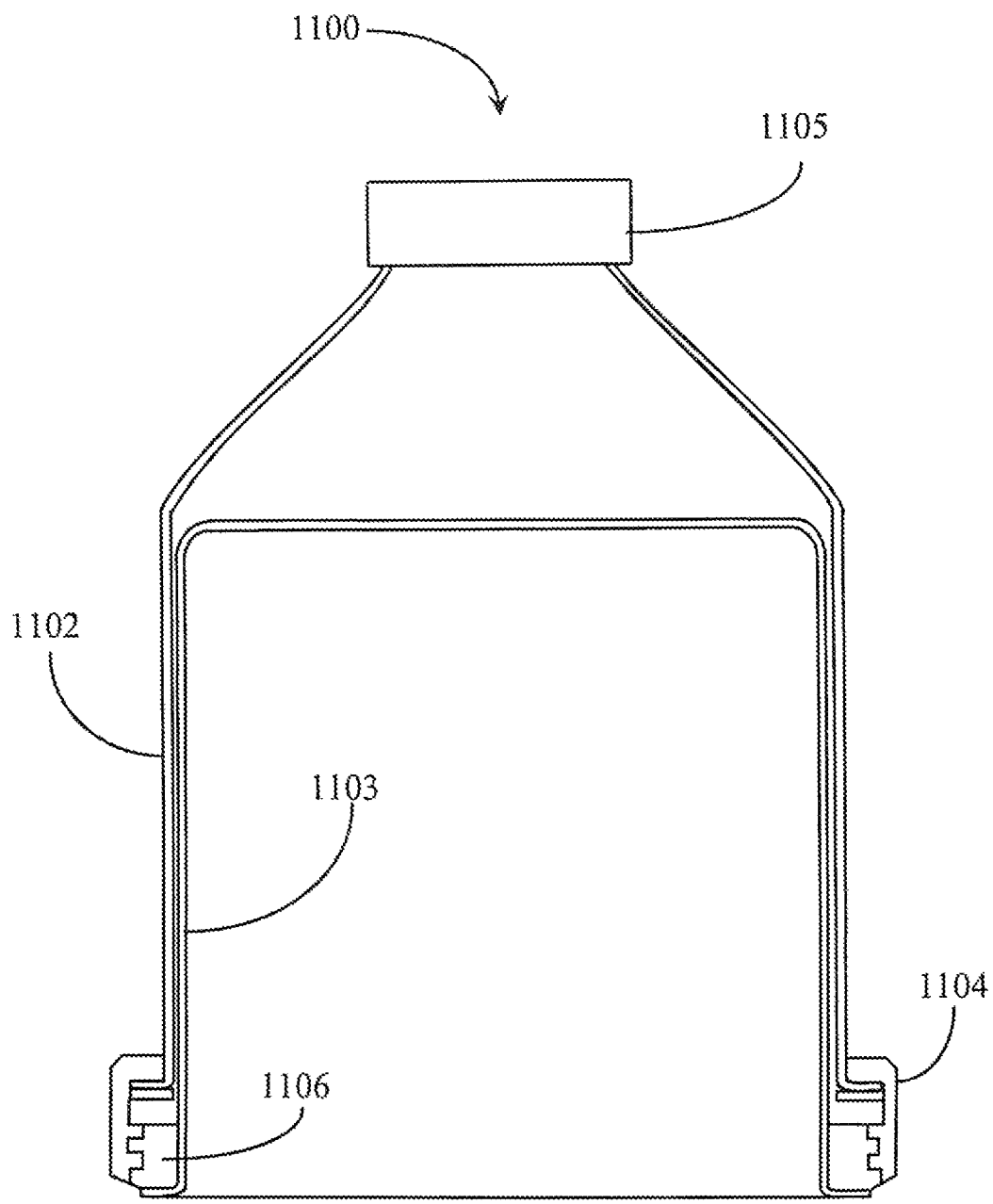
FIG. 12 is a sectional view of the bottle of FIG. 11 in a nested position according to an embodiment of the present invention.

FIG. 12 is a sectional view of bottle 1100 of FIG. 11 in a nested position according to an embodiment of the present invention. Bottom bottle section 1103 is inverted in position and is nested within top bottle portion 1102. Collars 1104 and 1106 are used in this embodiment to secure the bottle sections in the nested configuration. Although not illustrated in this example, collar 1106 may be attached or affixed to the flange on the bottom bottle section so that when nested the bottom bottle section cannot slide down from the bottom collar.

It will be apparent to the skilled person that there are number of different ways that particular features taught in this disclosure may be accomplished, and that the drawings and description provided are examples, not limiting, but suggestive of other ways such features may be accomplished. There may be several different sorts of metals used, as long as the metals are relatively inert to chemical reaction from water, foodstuffs, or other consumables. Similarly there may be a number of seal materials suitable other than the silicone material suggested here as preferable. In one embodiment sections of different lengths may be used, so that a single bottom section for example, may be joined with different upper sections to make bottles of different capacity. There is no limitation as to how many sections may be joined for a single container. There are many other variations that will be within the spirit and scope of the invention.

It will be apparent to one with skill in the art that the assembled container system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A cylindrical container assembly for storing foodstuffs or liquids comprising:
   a container comprising:
      an upper annular sidewall section having:
         an upper open top defining a rim;
         an upper open bottom defining an upward facing flange;
      a lower cup section axially aligned with the upper annular sidewall and comprising:
         a lower open top defining a downward facing flange;
         an annular lower sidewall;
         a closed base
      an annular seal disposed between the upward facing and downward facing flanges for sealing the upper and lower bodies together;
      a first threaded collar having an upper hook portion affixed to upward facing flange of the upper body and a lower threaded portion on an inner surface; and
      a second threaded collar having a top surface affixed to the downward facing flange of the lower cup section, an inner annular surface abutting an outer annular surface of the annular lower sidewall, and an outer threaded portion mating with the lower threaded portion of the first threaded collar to sealingly compress the seal between the flanges, thereby securing the upper annular sidewall section with the lower cup section.

2. The container of claim 1, wherein annular sidewall section with the lower cup section are manufactured of a stainless steel.

3. The container of claim 1, wherein the seal is silicone and the first and second threaded collars are plastic.

4. The container of claim 1, wherein the rim of the upper annular sidewall section is threaded to receive a threaded cover.

5. The container of claim 1, wherein the upper annular sidewall section is smaller in diameter than the lower cup section and fits into the lower cup section in an inverted position.

6. The container of claim 1, wherein the lower cup section is smaller in diameter than the upper annular sidewall section body and fits into the upper annular sidewall section in an inverted position.

7. The container of claim 6, wherein the lower cup section and upper annular sidewall section are held together in a nested configuration by the threaded collars.

8. A container assembly for storing foodstuffs or liquids comprising:
- a container wherein foodstuffs or liquids are stored;
- an upper container section comprising:
    - an annular elongated upper body;
    - an open top end adapted to receive a cap;
    - an open bottom a second open end culminating in an outwardly extending upper flange defining an upwardly facing channel;
- a lower container section comprising:
    - an annular elongated lower body vertically aligned beneath the annular elongated upper body;
    - an upper open end culminating in an outwardly extending lower flange;
    - a closed base;
- an annular seal sandwiched between the upper and lower flanges, for sealing the upper and lower bodies together to form a main compartment;
- a first threaded collar with internal threading is affixed to the upwardly facing channel of the upper body; and a second threaded collar with external threading is affixed to the lower flange of the lower body, the first and second collars are threaded together at opposite sides of the seal, thereby compressing the seal between the flanges, and securing the upper and lower bodies tightly together;
- wherein the lower body is smaller in diameter than the upper body and the lower body fits into the upper body when the lower body is placed in an inverted position; and
- wherein the lower body is inverted and stored and into the upper body and is secured by threading the first and second collars together in a fixed stored position.

* * * * *